United States Patent [19]
Dolfsma et al.

[11] Patent Number: 5,008,623
[45] Date of Patent: Apr. 16, 1991

[54] METHOD AND APPARATUS FOR TESTING BALLS WITH THE USE OF EDDY CURRENTS

[75] Inventors: Hendrik Dolfsma, Tull en 't Waal; Hendrik van Engelenburg, Driebergen, both of Netherlands

[73] Assignee: SKF Industrial Trading and Development Company BV, DT Nieuwegein, Netherlands

[21] Appl. No.: 495,349

[22] Filed: Mar. 19, 1990

[30] Foreign Application Priority Data

Apr. 5, 1989 [NL] Netherlands ................... 8900848

[51] Int. Cl.[5] ............... G01R 33/00; G01N 27/72
[52] U.S. Cl. .......................... 324/262; 324/226; 324/238
[58] Field of Search ............... 324/226, 238, 240, 262

[56] References Cited

U.S. PATENT DOCUMENTS 3,607,198 9/1971 Meunier et al. .
4,430,614 2/1984 Gereg ........................... 324/262
4,551,677 11/1985 Bankston ....................... 324/226

FOREIGN PATENT DOCUMENTS 6803700 3/1967 Netherlands .

Primary Examiner—Walter E. Snow

[57] ABSTRACT

Method, according to the eddy current method, for checking damage on the surface of round, e.g., ball-shaped, metal objects, whereby a similar object is supported and made to rotate around at least one axis while an electronic contact-free scanner or sensor is aimed at the surface of the object, characterized by the fact that the round object is placed on a fixed support and a gaseous medium, e.g., air is blown against the object in such manner that between the support and the object a gas or air layer is formed which carries the object, and the object is made to rotate by the gas or air flow.

6 Claims, 1 Drawing Sheet

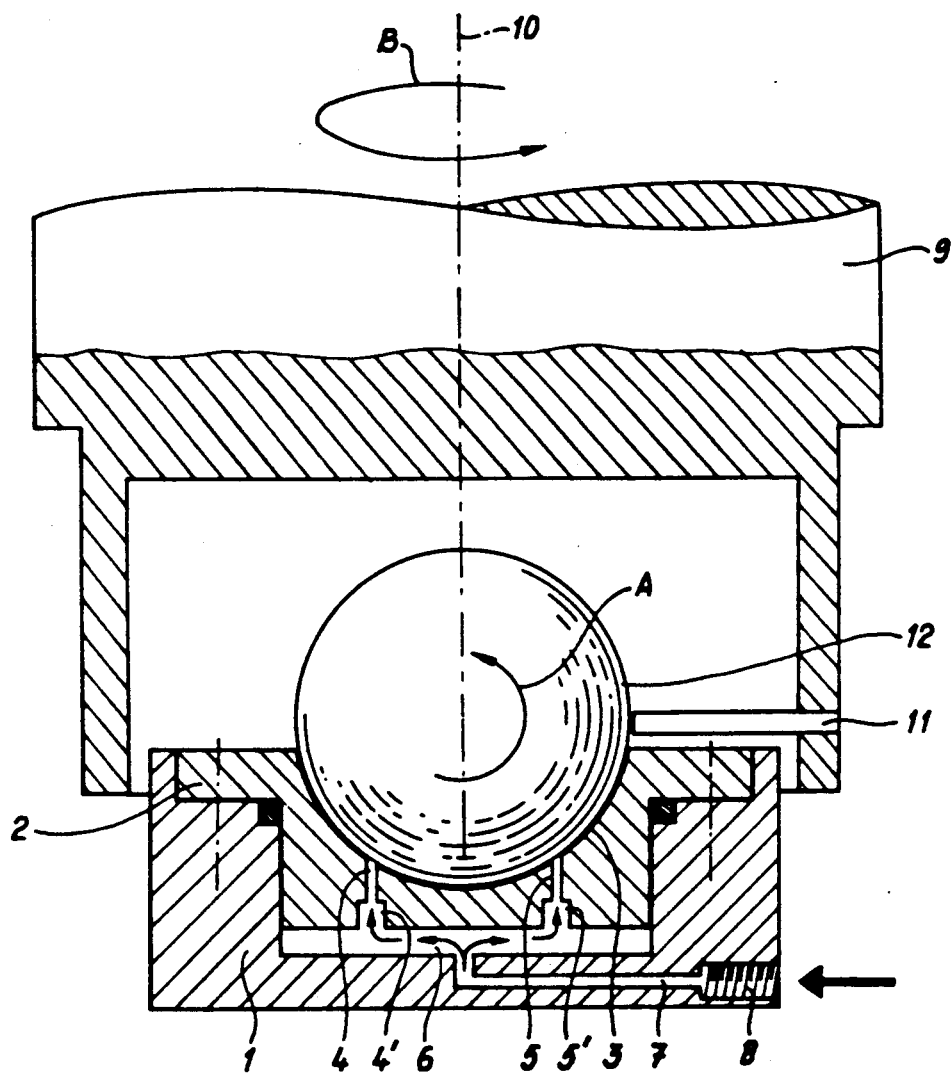

METHOD AND APPARATUS FOR TESTING BALLS WITH THE USE OF EDDY CURRENTS

The invention concerns a method—according to the eddy current method—for checking damage on the surface of round, e.g., ball-shaped, metal objects, whereby a similar object is supported and made to rotate around at least one axis while an electronic contact-free scanner or sensor is aimed at the surface of the object. A similar method is generally known.

The characteristics of the eddy currents is based on the fact that the rate at which an alternating electromagnetic field and the eddy currents generated by it penetrate a metal is inversely proportional to the square root of the frequency. Thus, the greater the frequency the smaller the penetration. By applying eddy currents with various frequencies the metal can be checked at various levels of depth. In the case of an object which has undergone surface treatment, a high frequency will basically measure the surface layer while the lower frequencies will penetrate the core, so that if the electromagnetic properties of the surface layer and the core are sufficiently different, the condition of the surface layer may be determined on the basis of these measurements.

With the known method a ball-shaped or spherical object is placed on and between two rotating rollers so that the object is mechanically made to rotate around two different axes, while the surface of the object is guided past a fixed scanner or sensor and the condition of the surface is checked according to the principle mentioned earlier.

The disadvantages of this method are that because the object is driven mechanically its rotational stability leaves much to be desired, so that the distance between the scanner or sensor and the surface of the object does not remain constant; moreover, the object may be damaged when it is placed on the rollers. In addition, the roller surfaces are subject to wear and tear and it is difficult to align and adjust the roller axes.

The purpose of the invention is to create a method like the one described above, which does not possess the same disadvantages.

This purpose is achieved with the method according to the invention by placing the round object on a fixed support while a gaseous medium, e.g., air, is blown against the object in such manner that a gas or air layer is formed between the support and the object, which layer supports the object, and the object is made to rotate by the gas or air flow.

Accordingly, the object is supported by an air cushion so that there is no contact with a solid material and the object cannot be damaged. In addition, the rotational stability of the object increases.

With the method according to the invention the spherical object has excellent rotational stability, the conditions are advantageous for making a sensor aimed at the surface of the object revolve in a circular orbit around an axis which passes through the center of the object, allowing the total surface of the object to be checked very rapidly, which leads to major time savings compared to the known method.

The invention concerns a device for applying the method, which includes a support for the object to be checked, means for making the object rotate, and an electronic contact-free sensor, whereby according to the invention the support contains a cavity in which a number of channels exit, which channels may be connected to a gas source under pressure, and the sensor is located above this cavity.

Preferably, the contact-free sensor or scanner is attached to a rotatable pivot whose axis passes through the center of the cavity.

It should be noted that the process of supporting an object by means of an air layer or air cushion is known per se e.g., from a Dutch patent application, No. 6803700.

The invention is explained further with the aid of the drawing which shows an embodiment of a device according to the invention.

As the drawing shows, the device includes an assembly 1 in which an insert 2 has been placed. The insert 2 has a recess 3 shaped like a spherical segment and channels 4, 5 which lead via widened sections 4', 5' to a space 6 where an air supply channel 7 exits which can be connected to a source of air pressure at point 8.

A pivot 9 is attached above the assembly 1, 2, which by means of a special alloy rotates cleanly around a vertical axis 10 passing through the center of the recess 3. A contact-free sensor or scanner 11 is attached to this pivot.

When the device is operational a spherical object 12 which has to be checked, e.g., a ball for a roller-bearing, is placed in recess 3, while by way of channel 7, air under pressure is blown into space 6 through the channels 4 and 5, so that between the object 12 and the recess 3 an air cushion is formed which carries the object 12. The channels 4 and 5 have different diameters, chosen in such a manner that the object 12 is given a rotational movement—according to arrow A—by the air currents flowing through channels 4 and 5. The pivot 9 is made to rotate—according to arrow B—causing the total surface of the ball 12 to be scanned very rapidly by the sensor 11.

We claim:

1. In a method employing eddy currents for checking damage on the surface of a round, e.g., ball-shaped, metal object, wherein the object is supported and made to rotate around at least one axis while an electronic contact-free scanner or sensor is aimed at the surface of the object, the improvement comprising placing the round object on a fixed support, and blowing a gaseous medium against the object to flow between the support and the object in a direction to form a gas layer that supports the object, said step of blowing comprising blowing the gas to impart a rotational movement to the object.

2. The method of claim 1, further comprising aiming the scanner or sensor at the surface of the object and rotating the scanner or sensor in a circular orbit around an axis passing through the center of the object.

3. In a device for employing eddy currents for checking damage to the surface of a round metal object, including a support for the object, means for making the object rotate and an electronic, contact-free scanner or sensor for scanning the object, the improvement wherein the support contains an upwardly open cavity for receiving and supporting said object, a number of channels opening into said cavity, means for connecting the channels to a gas source under pressure to urge an object in said cavity upwardly, said scanner or sensor comprising an electronic contact-free scanner or sensor mounted above said cavity.

4. The device of claim 3, further comprising a rotatable pivot, said scanner or sensor being attached to said rotatable pivot, said pivot having an axis that passes through the center of the cavity.

5. The method of claim 2 wherein said step of rotating the scanner or sensor comprises moving said scanner or sensor in a horizontal plane completely around said object.

6. The device of claim 4 wherein said pivot is suspended above said cavity, whereby said scanner or sensor is rotatable fully around said object.

* * * * *

UNITED STATES PATENT AND TRADEMARK OFFICE
CERTIFICATE OF CORRECTION

PATENT NO. : 5,008,623

DATED : April 16, 1991

INVENTOR(S) : HENDRIK DOLFSMA, ET AL.

It is certified that error appears in the above-identified patent and that said Letters Patent is hereby corrected as shown below:

Column 1, line 64, after "The invention" insert --also--.

Signed and Sealed this

Twentieth Day of October, 1992

Attest:

DOUGLAS B. COMER

*Attesting Officer*  *Acting Commissioner of Patents and Trademarks*